(12) United States Patent
Schmidt et al.

(10) Patent No.: US 7,191,724 B2
(45) Date of Patent: Mar. 20, 2007

(54) METHOD AND SYSTEM FOR MISSION MODULE SWAPPING IN A VESSEL

(75) Inventors: Terrence W. Schmidt, Santa Clara, CA (US); Gary M. Noland, Pleasanton, CA (US); Anthony J. Mannino, Twain Harte, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/712,987

(22) Filed: Nov. 12, 2003

(65) Prior Publication Data

US 2004/0149194 A1 Aug. 5, 2004

Related U.S. Application Data

(60) Provisional application No. 60/426,070, filed on Nov. 12, 2002.

(51) Int. Cl.
 *B68B 35/40* (2006.01)
(52) U.S. Cl. .................... 114/259; 114/61.1
(58) Field of Classification Search .............. 114/60, 114/61.1, 66, 260, 65 R, 258, 259, 121, 125; 244/158 R, 159
 See application file for complete search history.

(56) References Cited

U.S. PATENT DOCUMENTS

| | | | | |
|---|---|---|---|---|
| 1,107,741 A * | 8/1914 | Ballin et al. | ................. | 114/260 |
| 3,417,721 A | 12/1968 | Vienna | | |
| 3,437,067 A | 4/1969 | Malin | | |
| 3,602,730 A * | 8/1971 | Cushing | ...................... | 114/72 |
| 3,776,167 A * | 12/1973 | Marbury, Jr. | ................. | 114/259 |
| 3,823,681 A | 7/1974 | Cushing et al. | | |
| 3,835,802 A * | 9/1974 | Vernede et al. | ............. | 114/260 |
| 3,913,512 A * | 10/1975 | Kirby et al. | ................. | 114/260 |
| 3,934,530 A * | 1/1976 | Kossa et al. | ................. | 114/260 |
| 4,085,695 A * | 4/1978 | Bylo | ........................... | 114/260 |
| 4,135,468 A * | 1/1979 | Kirby et al. | ................. | 114/260 |
| 4,292,915 A * | 10/1981 | Nemec | ....................... | 114/260 |
| 4,476,798 A * | 10/1984 | Backus | ..................... | 114/77 R |
| 4,615,292 A | 10/1986 | Laukien | | |
| 4,986,204 A | 1/1991 | Yoshida | | |
| 5,043,065 A | 8/1991 | Propp | | |
| 5,277,117 A | 1/1994 | Bender et al. | | |
| 5,417,597 A * | 5/1995 | Levedahl | ................... | 114/65 R |
| 5,787,828 A | 8/1998 | Barbier et al. | | |
| 5,791,600 A * | 8/1998 | Thompson | ................... | 244/159 |
| 5,806,799 A * | 9/1998 | Lounge | .................. | 244/158 R |
| 5,862,770 A * | 1/1999 | Aavitsland | ................... | 114/260 |
| 5,967,072 A | 10/1999 | Leary | | |
| 6,223,669 B1 * | 5/2001 | Bowden | .................... | 114/65 R |
| 6,550,408 B1 | 4/2003 | Janssen | | |
| 6,843,198 B1 * | 1/2005 | Witbeck | ...................... | 114/258 |

FOREIGN PATENT DOCUMENTS

| | | |
|---|---|---|
| FR | 2688466 | 9/1993 |
| JP | 52143691 A | 11/1977 |
| JP | 06040379 A | 2/1994 |

* cited by examiner

*Primary Examiner*—Lars A. Olson
(74) *Attorney, Agent, or Firm*—Mark A. Wurm; Graybeal Jackson Haley LLP

(57) ABSTRACT

A method for outfitting a vessel such as a water ship for a particular mission includes maneuvering the vessel toward a mission module, capturing the mission module with the vessel, and coupling the mission module to the vessel. Such method allows one to interchange mission modules, and thus outfit a vessel for different missions, quickly and easily.

33 Claims, 8 Drawing Sheets

METHOD AND SYSTEM FOR MISSION MODULE SWAPPING IN A VESSEL

CLAIM OF PRIORITY

This application claims priority from U.S. Provisional Application Ser. No. 60/426,070 filed on Nov. 12, 2002, which is incorporated by reference.

CROSS REFERENCE TO RELATED APPLICATIONS

This application is related to U.S. patent application Ser. Nos. 10/712,777 entitled MISSION MODULE SHIP DESIGN, and 10/712,786 entitled VESSEL WITH A MULTI-MODE HULL, which have a common filing date and owner, and which are incorporated by reference.

BACKGROUND OF THE INVENTION

Modern naval ships are typically designed to perform multiple types of missions, and are, therefore, referred to as "multi-mission" ships. For example, suppose a ship is designed for anti-submarine warfare, littoral warfare, and anti-mine warfare. Such a ship may include a deck that has a respective command/control station for each type of mission, i.e., a station for anti-submarine warfare, a station for littoral warfare, and a station for anti-mine warfare. The ship may also have a hull that, although not ideal for any particular type of mission, is at least compatible with all of the mission types for which the ship is designed.

One problem with such a multi-mission-type ship is that it is often larger than it needs to be for a single type of mission. For example, if a deck of the ship has a respective command/control station for each type of mission, then the deck, and most likely the ship, is bigger than it would be if it included only a single station for a single type of mission. Mulit-mission ships are, therefore, high-value capital assets, typically carry a large crew to support the various missions, and are generally operated only in regions where a high degree of protection is supplied by other friendly ships.

Another problem is that multi-mission-type ships are typically inefficient. For example, if the ship is designed to perform three types of mission and includes a respective command/control station for each mission type, then two of the three stations are typically unused when the ship is on a mission.

Furthermore, the hull of such a multi-mission ship is typically not ideal for any of the mission types for which the ship is designed. That is, if the hull is ideal for one type of mission, it may be incompatible with another type of mission. Therefore, when designing a hull that is compatible with multiple types of missions, a designer must often design the hull as a compromise across all missions.

SUMMARY OF THE INVENTION

An embodiment of the invention is directed to a method for maneuvering a vessel near a mission module, capturing the module with the vessel, and then coupling the mission module to the vessel.

By interchanging mission modules, a crew can quickly and easily provide the ship with different mission capabilities. More specifically, by designing a hull structure with a bay for different types of mission modules, a first module designed to provide systems and facilities for a first type of mission can be removed and a second mission module designed to provide systems and facilities for a second type of mission can be installed. Because the interfaces between each mission module and the hull structure and/or the ship's control systems are typically compatible for most mission modules, retrofitting a ship for a different mission is achieved quickly and easily.

Furthermore, because the mission modules are easily interchanged, a ship may be retrofitted while deployed. That is, a ship may jettison a first mission module and then acquire a new mission module without the requirement of leaving the operating theater and transiting to friendly port or to a dry dock.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

Figure 1:
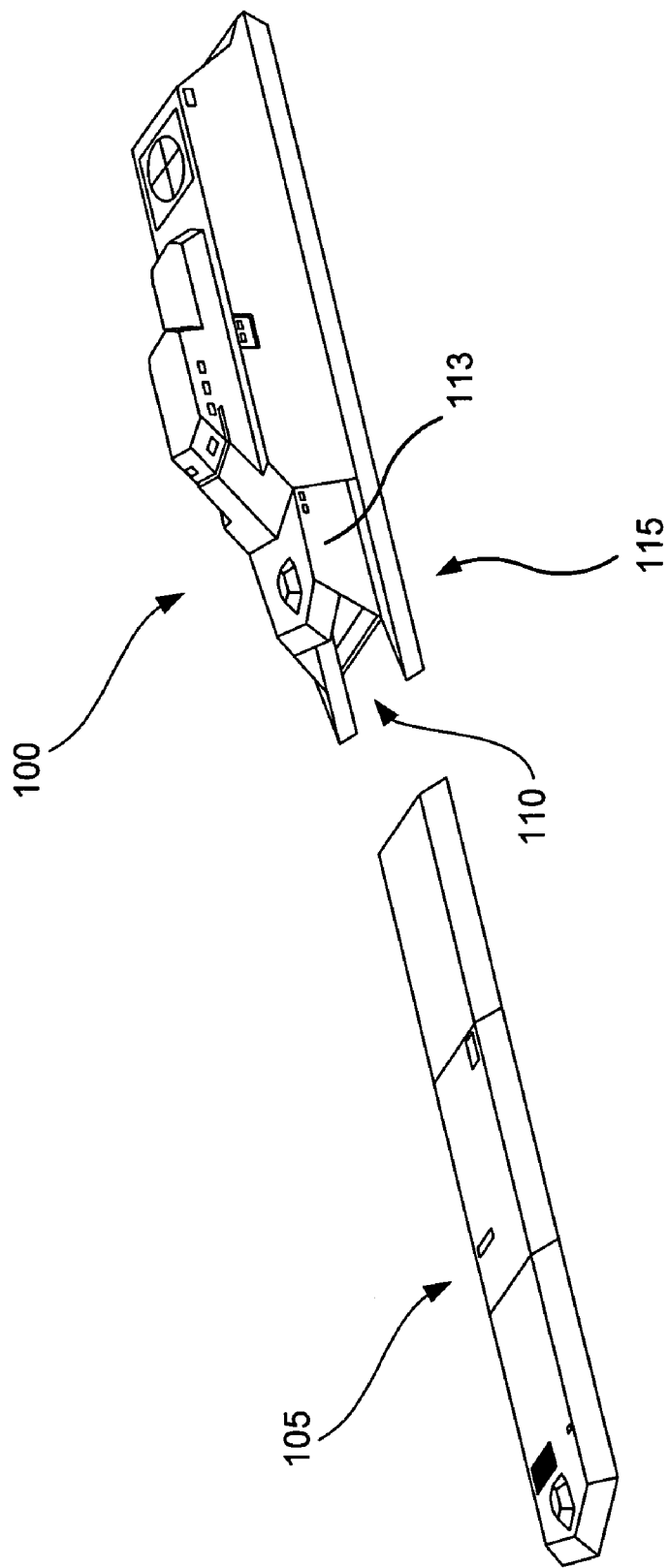
FIG. 1 is an isometric view of a multi-mission ship and an associated mission module according to an embodiment of the invention.

FIG. 1 is an isometric view diagram of a multi-mission ship 100 and an associated mission module 105 according to an embodiment of the invention. The ship 100 may be a monohull, a multihull (such as a catamaran, Trimaran, Pentamaran, etc.), a small-waterplane-area twin hull (SWATH), a multi-mode hull such as discussed gelow in conjunction with FIGS. 5A–5D, or other type of hullform. The ship 100 includes a hull structure or frame 115 that is designed to accept one or more mission modules 105 (only one shown in FIG. 1). The frame 115 includes two lower hull portions 112a and 112b and associated interconnecting structures (called struts hereinafter) that extend down from a main body 113, (one strut and lower hull 112a extending down from the port side and one strut and lower hull 112b extending down from the starboard side) such that a receptacle or bay 110 is enclosed by the struts and lower hulls 112a and 112b and the main body 113. The bay 110 creates a cavity such that water is free to flow in and out of the bay area as the hull portions 112a and 112b are only coupled to the main body 113 which stays above the surface of the water because of the buoyancy of the struts and lower hulls 112a and 112b. As such, a small watercraft or other floating objects may traverse into the bay 110, below the main body 113, between the struts 112a and 112b, and even out the back side of the ship 100 without ever contacting the any portion of the ship 100. Similarly, a mission module 105 may also pass through the ship 100 in this manner, however, a mission module 105 is typically engaged (by a lifting mechanism described below) when it is directly under the ship 100. In an alternative embodiment, the back side of the ship 100 is not open to the water and objects may not pass completely through the bay 110 from one side to the other.

Mission modules 105 are designed with different capabilities that, when interfaced with the ship 100, provide the ship 100 with mission-specific functionality for respective types of missions. That is, a mission module 105 is capable of carrying the equipment and supplies necessary to conduct a specified mission. In this aspect, the ship 100 is somewhat analogous to a personal computer that includes a mother board (analogous to the frame 115) designed to accept one or more plug in cards (analogous to the mission module 105) that give the computer a desired functionality. Consequently, the ship 100 can be retrofitted for a particular type of mission merely by swapping out one mission module 105 for another. As discussed below, by designing a mission module 105 for a specific mission, one can quickly retrofit the ship 100 while deployed (as opposed to being in a port) such that the ship's retrofit downtime is reduced.

Generally, a mission module 105 comprises a watertight exterior and a reinforced interior structure that includes associated propulsion and auxiliary systems such that the mission module 105 is sufficiently sea worthy for short distance transits from one ship or dock to the intended host frame.

More specifically, as discussed above, a mission module 105 typically includes the equipment and other resources necessary to execute a particular type of mission. For example, the module 105 may include, e.g., one or more mission-specific operator/control stations (not shown), a mission-specific computer system, quarters and supplies (not shown) for additional crew needed for the mission, hangers for mission-specific equipment such as a helicopter or unmanned vehicle, and a tank for extra fuel.

The mission module 105 may also enhance the non-module, i.e., permanent, resources of the ship 100 for compatibility with the type of mission(s) for which the module is designed. For example, the ship 100 may include a general operator/control station (not shown), which the computer system of the module 105 can configure for the corresponding type of mission via an interface with the ship's computer system. Or, the module 105 may carry extra fuel and supplies for a long-range mission.

Still referring to FIG. 1, although the module 105 is separable from the frame 115 of the ship 100, when installed in the bay 110, the module appears as an integral part of the ship according to an embodiment of the invention. For example, it is contemplated that in a module 105 having operator/control stations and/or crew quarters, crew would enter and exit the module in the same manner that they would any other portion of the ship.

Mission-modules 105 are contemplated for a number of mission types, including, but not limited to, anti-mine warfare, anti-submarine warfare, littoral operations, search and rescue, stealth delivery of personnel or supplies, a logistics support system such as special equipment transport or medical facilities, and/or a maritime intercept system. Alternatively, the module 105 may merely be used to provide the ship 100 with additional fuel, supplies, or cargo space. Furthermore, although described as supporting a single type of mission, the mission module 105 may support multiple mission types. In addition, although shown as including a single bay 110, the frame 115 may include multiple bays 110 that can each receive a respective module 105.

Figure 2:
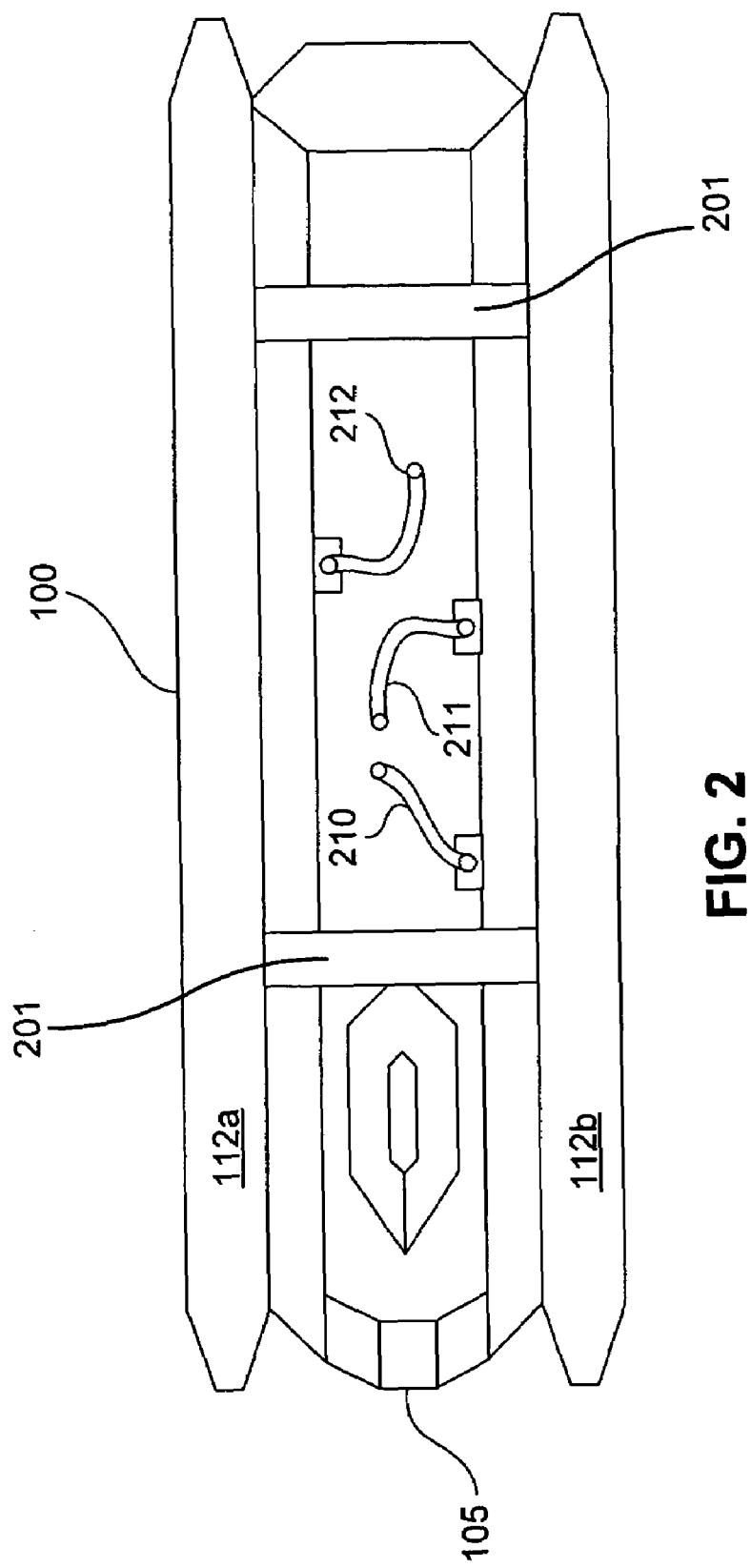
FIG. 2 is a cutaway plan view of a multi-mission-type ship with a mission module engaged according to an embodiment of the invention.

FIG. 2 is a cutaway plan view of the multi-mission ship 100 with the mission module 105 engaged within the bay 110 according to an embodiment of the invention.

The systems of the mission module 105 are connected to the respective systems of the ship 100 via ship-to-module interfaces as discussed below. Specifically, the ship-to-module interfaces include physical connections between the frame 115 and the mission module 105. For example, as shown in FIG. 2, cross-mounting structures 201 hold the mission module 105 securely within the bay 110 while the mission module is engaged therein. A fuel interface 210 provides the capability to transfer fuel to and from the mission module 105. A water interface 211 provides the capability to transfer fresh and/or waste water to and from the mission module 105. A computer and electrical interface 212 allows the transfer of electricity to and from the mission module 105, and allows the mission-module computer system to communicate with the frame 115 computer system. Alternatively, if the mission module 105 includes no computer system, the interface 212 allows the frame 115 computer to connect to and control the module. Other ship-to-module interfaces are contemplated, but are not discussed for brevity.

After the mission module 105 enters the bay 110, crew members mate each ship-to-module interface on the mission module 105 with the corresponding interface on the frame 115. Alternatively, the mating of the interfaces may be automated. In one implementation, the interfaces are universal for all ships 100 and mission modules 105 in a fleet so that a crew can install virtually any mission module 105 in the bay 110 of virtually any ship frame 115 using a common installation procedure. Likewise, a crew can remove virtually any mission module 105 from any bay 110 using a common removal procedure.

Alternate embodiments of the frame 115 and module 105 are contemplated. For example, although the bay 110 is described is being entirely below a deck (topside) of the ship 100, the frame 115 may have one or more deck openings (not shown) that allow portions of the module 105 to be exposed for use. For example, the module 105 may include a weapons turret (not shown) or an antenna array (not shown) that protrude through the deck openings. Or, the module 105 may include an elevator that can carry planes onto the ship deck via a deck opening.

FIGS. 3A–3D illustrate a procedure by which a crew replaces a first mission module 105a with a second mission module 105b according to an embodiment of the invention. As discussed below, this procedure allows a crew to retrofit the ship 100 relatively quickly and while out at sea, and thus eliminates the need for the ship to return to port for retrofitting.

Figure 3A:
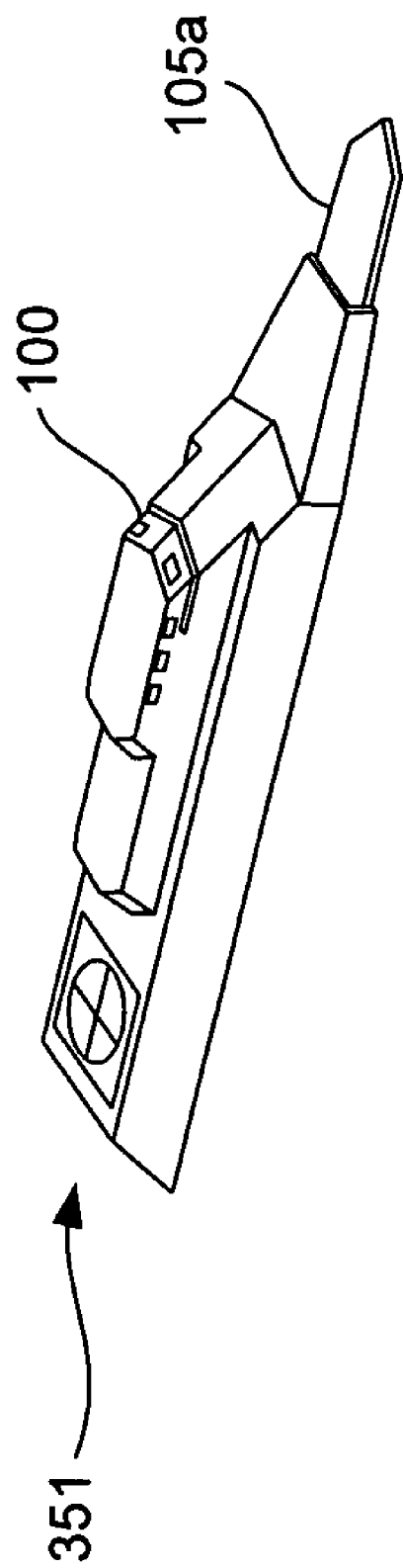
FIGS. 3A–3D illustrate a procedure for changing mission modules in the ship of FIG. 1 according to an embodiment of the invention.

As shown in FIG. 3A, the ship 100 disengages the first mission module 105a. When disengaging the first mission module 105a, crew members or other automatic means disconnect each ship-to-module interface (as shown in FIG. 2) between the frame 115 and the first mission module 105a. Then, the crew adjusts the draft (i.e., the depth of the struts 112a and 112b in the water)) of the ship 100 to the proper level such that the first mission module 105a is free to float out of the bay 110. The ship 100 may then begin moving away from the first mission module 105a in the direction indicated by the arrow 351 to completely remove the module 105a from the bay 110. In an alternate implementation, the ship 100 may include a crane or other lifting device (not shown) to remove the module 105 from the bay 110 and lower the module into the water. For example, the ship 100 may include straps (not shown) that engage the bottom of the module 105a. The crew can, therefore, lower the module 105a into the water by means of the straps and associated winching system (not shown).

Figure 3B:
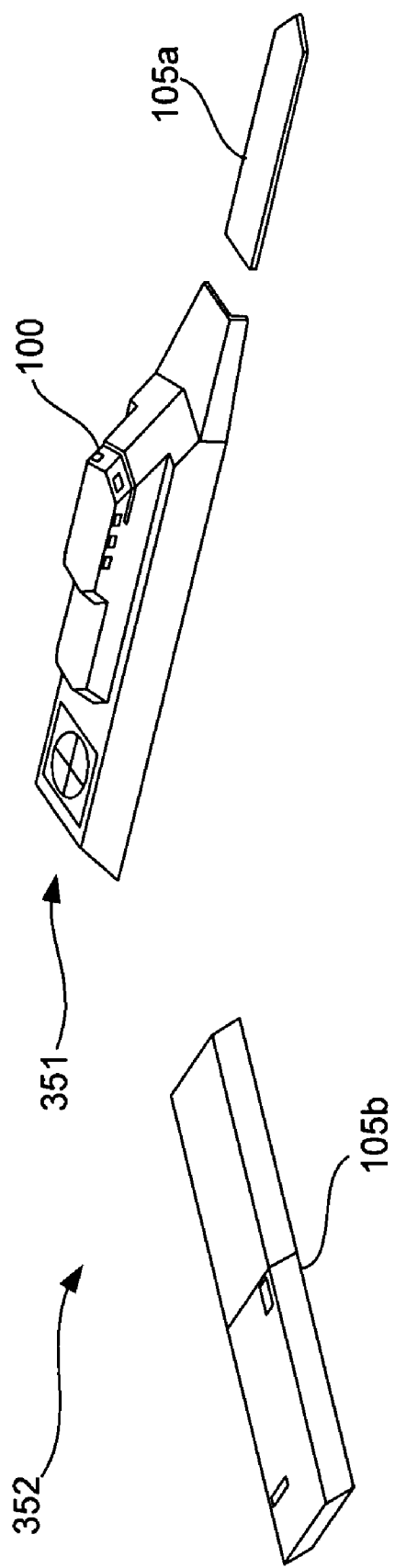

Next, as illustrated in FIG. 3B, the ship 100 maneuvers away from the first mission module 105a as indicated by the directional arrow 352. After moving far enough away from the first mission module 105a, the ship 100 then maneuvers into alignment with a second mission module 105b as indicated by directional arrow 353. Another ship (not shown) typically transports the second module 105b to the ship 100 and recovers the first module 105a.

Figure 3C:
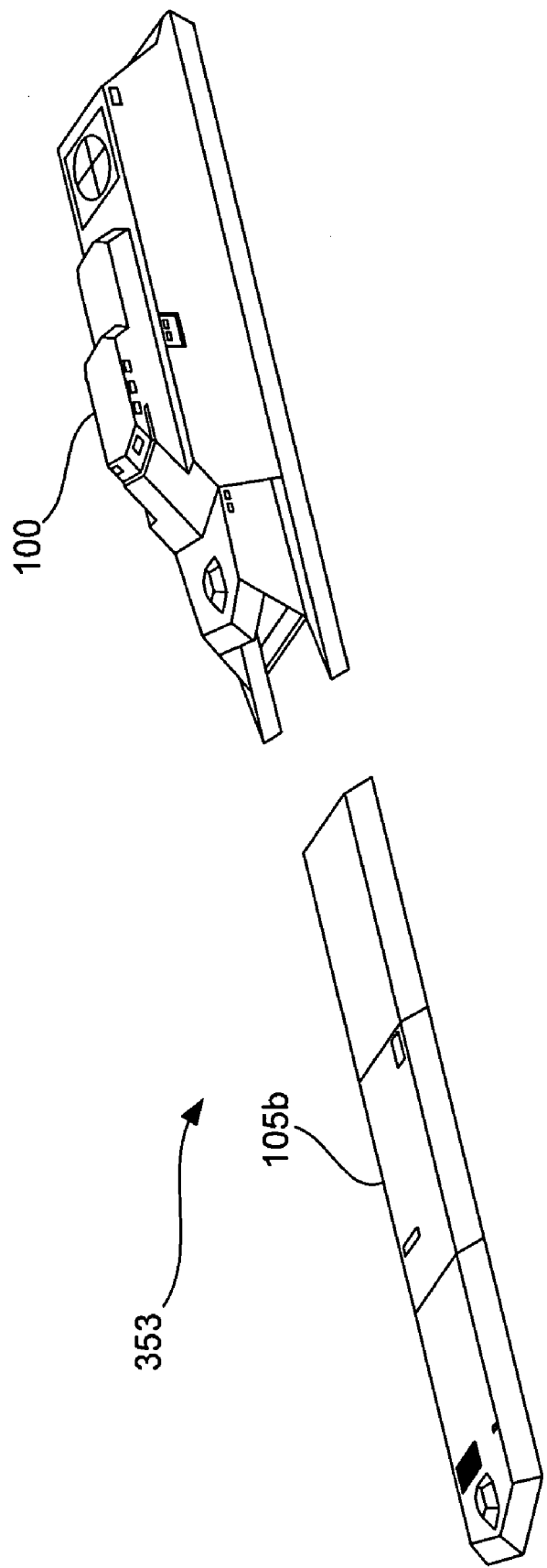

Next, as illustrated in FIG. 3C, the ship 100 traverses forward and toward the second mission module 105b as indicated by directional arrow 354. The crew then aligns the bay 110 with the module 105b, and sail toward the mission module such that it enters the bay 110.

Figure 3D:
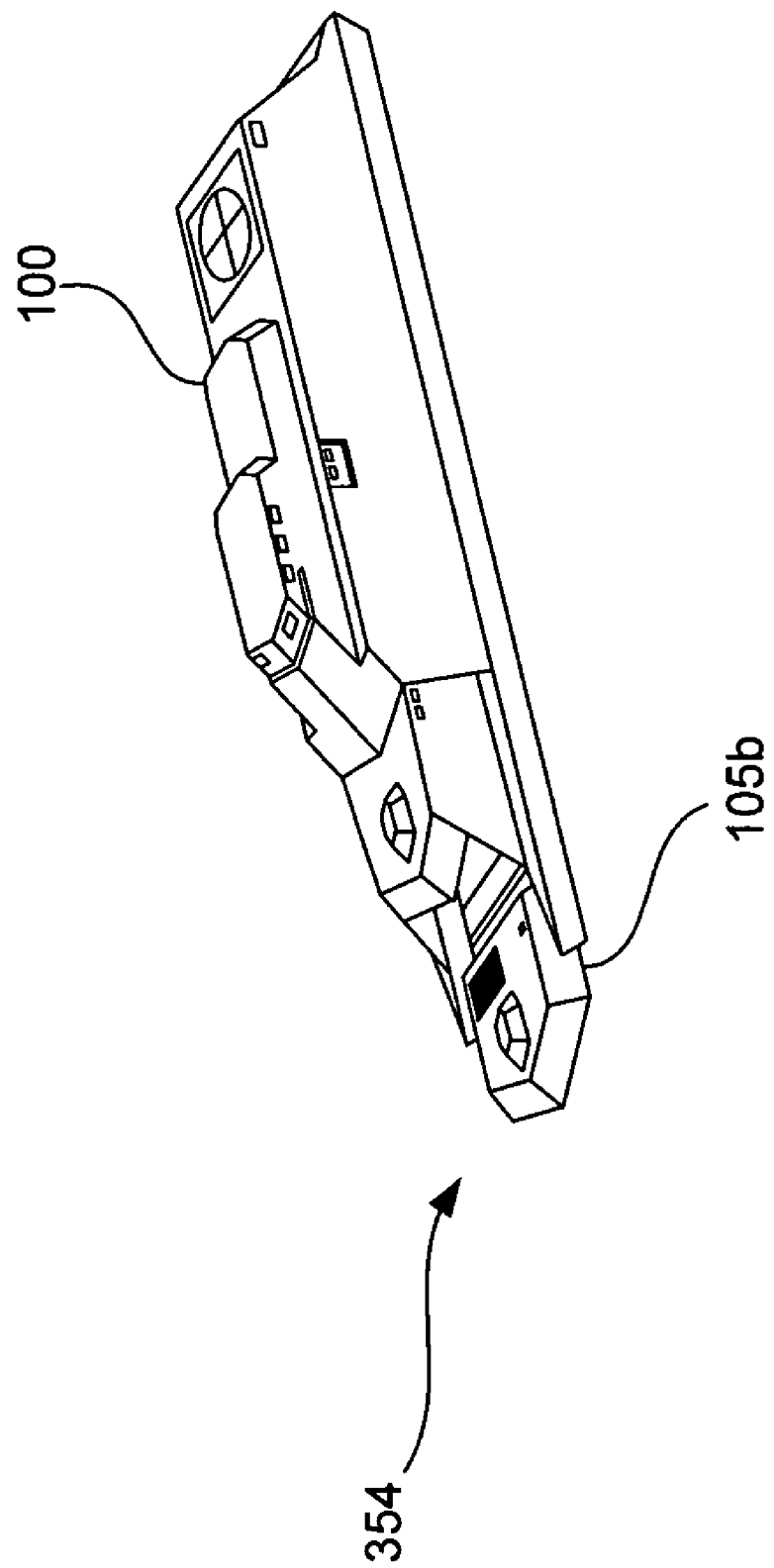

Finally, as illustrated in FIG. 3D, the ship 100 maneuvers into a final alignment position such that the second mission module 105b can be secured within the bay 110. Once the second mission module 105b is fully within the bay 110, the crew (or automatic means) of the ship 100 may then secure the second mission module within the bay. Next, each ship-to-module interface (FIG. 2) between the ship frame 115 and the second mission module 105b is connected according to the requirements of the functionality for which the second mission module is designed. Alternatively, where the draft of the ship 100 is such that the second mission module 105b cannot float into the bay 110, the crew may raise the second mission module out of the water and into the bay with a crane system or other similar lifting system (not shown). For example, the module 105b may be within or more loops formed by one or more straps (not shown) that hang down into the water (beneath the module 105b) from the bay 110. Then, when the module 105b is in the proper position, the crew can activate a winch or other device (not shown) to reel in the straps, and thus pull the module 105b up into the bay 110.

Once the second mission module 105b is engaged within the bay 110, the ship 100 is ready to begin its new mission. Still referring to FIGS. 3A–3D, in another implementation, the module 105 can include a motor or other propelling device such that it can maneuver into the bay 110. For example, crew on board the module 105 can steer the module into the bay 110, or crew on board the ship 100 can steer the module via remote control.

Figure 4:
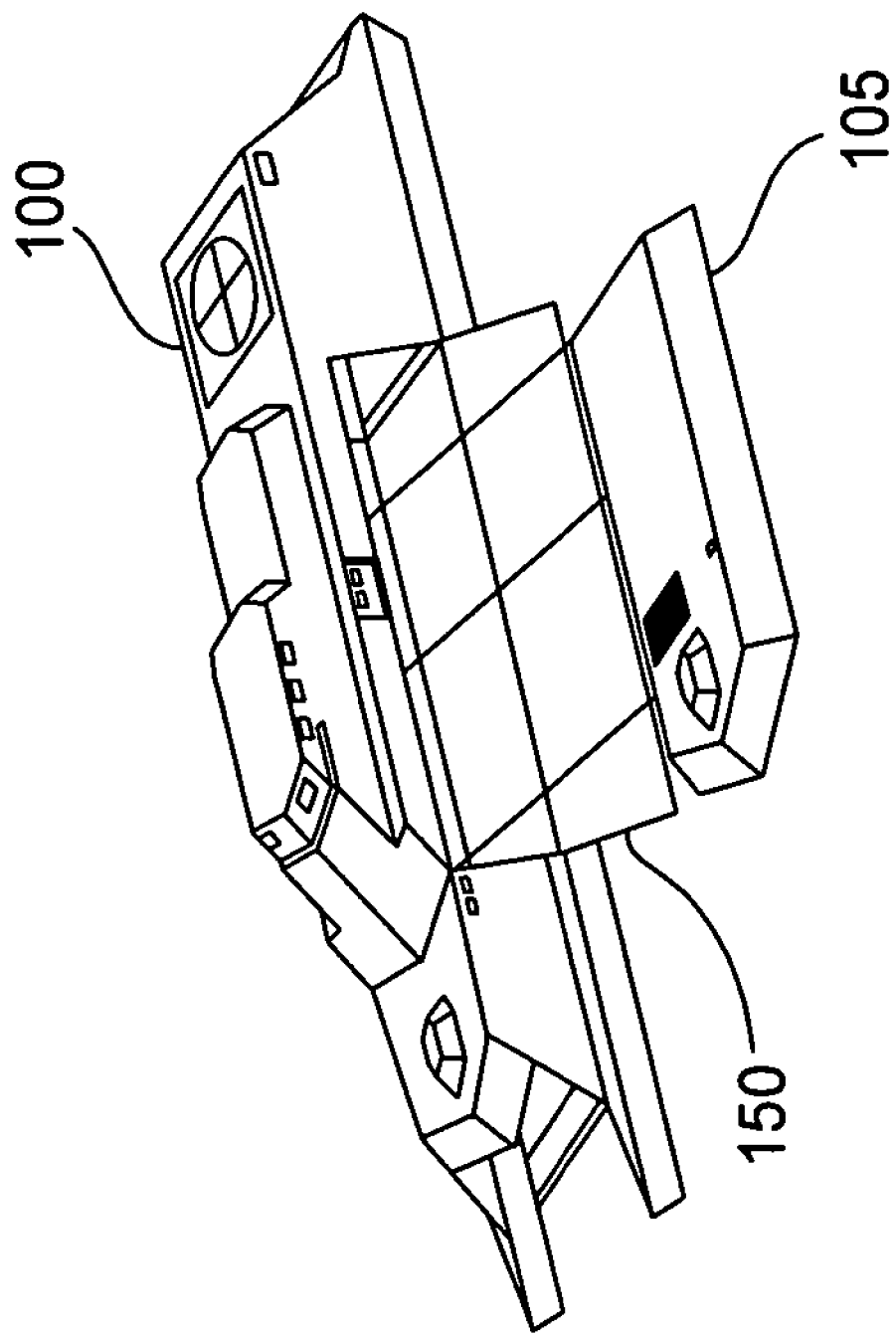
FIG. 4 illustrates an alternative procedure for changing mission modules in the ship of FIG. 1 according to an embodiment of the invention.

FIG. 4 illustrates a procedure for removing and installing mission modules according to another embodiment of the invention. For brevity, only the installation procedure is described here, it being understood that the removal procedure is merely the installation procedure in reverse.

Referring to FIG. 4, the frame 115 includes a ramp 150 that extends from the bay 110 via an opening at either the bow or stern of the ship 100. Using a winch assembly or other assembly (not shown), the crew pull the module 105 up the ramp 150 and into the bay 110. The crew may increase the draft of the ship, thus lowering the bay 110 opening toward the water, to facilitate the installation of the module 105. After the module 105 is fully within the bay 110, the crew retracts the ramp back into the bay 110 (for example, beneath the installed module 105). As discussed above, to remove the module 105, the crew extends the ramp 150 and pushes the module out of the bay 110, down the ramp, and into the water.

Once the mission module 105 is within the bay 110, the crew can secure the module within the bay 110 and can interface the various module systems to the frame 115 systems as discussed above in conjunction with FIGS. 1–3.

Referring to FIGS. 1–4, the modular design of the ship 100 provides many advantages in addition to those discussed above. For example, the module 105 can be readied in port, and the crew can be trained in port, while the ship 100 is executing a mission with another module. Then, the module 105 and crew can rendezvous with the ship 100, and the modules can be swapped as described above so that that ship is ready for its next mission without coming into port.

And although the ship 100 is described as a water-going vessel, the modular concept is applicable to other vehicles. For example, an airplane may have a modular passenger cabin. Consequently, ground crew can prepare the cabin and load the passengers while the plane is still in the air or is being serviced. When the plane lands, the crew removes one passenger cabin from the plane, and installs another pre-boarded and/or and pre-prepared cabin into the plane. Therefore, the departing passengers can effectively board the plane without having to wait for the arriving passengers to disembark the plane or for the crew to clean and restock the plane. The modular concept is also applicable to land vehicles such as a truck, automobile, HUMMVEE, or similar commercial or military vehicle, or to a space vehicle.

Still referring to FIGS. 1–4, although the modular design of the ship 100 allows a crew to quickly and easily retrofit the ship for different types of missions, the hull design of the ship may limit the types of missions that the ship can execute, or may limit the performance of the ship when conducting mission.

Figure 5A:
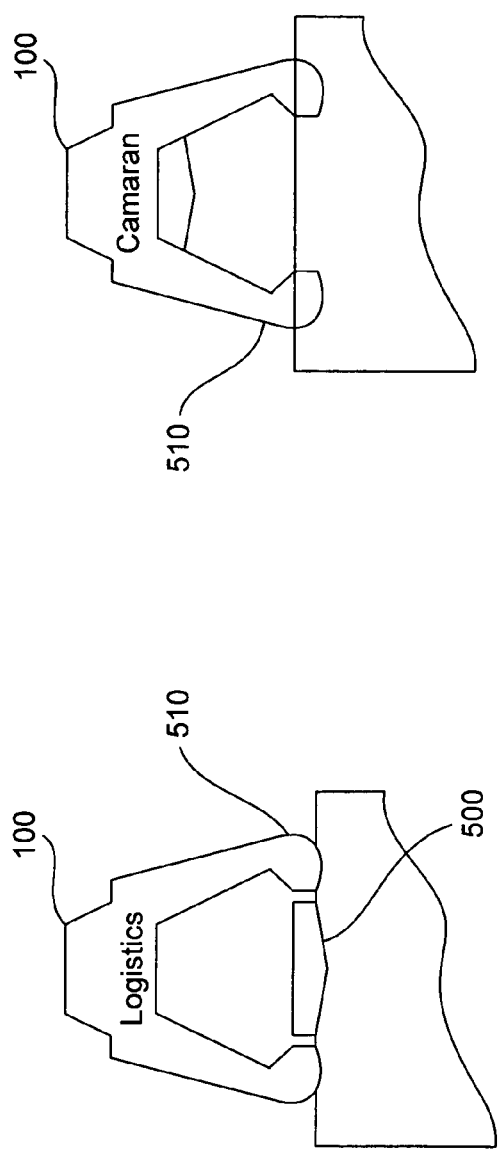
FIGS. 5A–5D are end views of a ship having a multi-mode hull according to an embodiment of the invention.
Figure 5B:
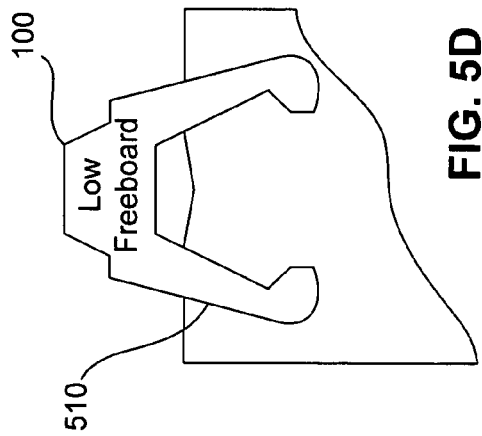
Figure 5C:
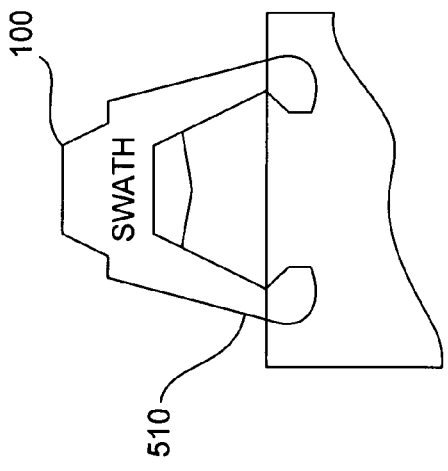
Figure 5D:
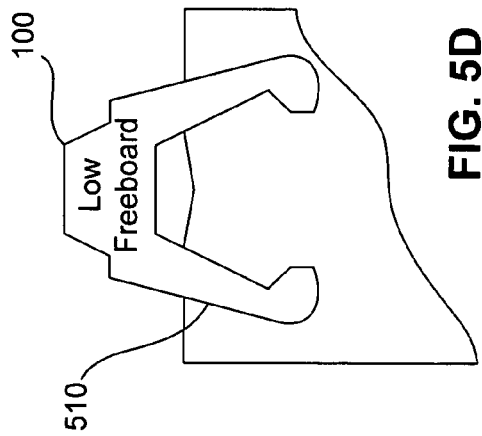

FIGS. 5A–5D are end views of a ship 100 of FIG. 1 having a multi-mode hull 510 that allows the ship 100 to execute a mission with a suitable type of hull for that mission according to an embodiment of the invention. The multi-mode hull 510 is a foil-assisted twin hull that combines a plurality of functions from several proven hull designs. The multi-mode hull 510 allows the ship 100 to operate in at least the following four modes: a logistics mode (FIG. 5A), a catamaran mode (FIG. 5B), a SWATH mode (FIG. 5C), and a low freeboard mode (FIG. 5D). The crew can easily switch from one mode to another by merely adjusting the draft of the ship 100. The draft of the ship 100 can be adjusted by adjusting the water levels in the ballast tanks (not shown) or through movable buoyant devices (also not shown) using practices well-established in the maritime industry.

Referring to FIG. 5A, in the logistics mode, the ship 100 rides higher in the water than it does in any other of the modes. A typical draft for the hull 510 of a multi-mode hull ship 100 in the logistics mode is 9 feet. Therefore, in the logistics mode, the ship 100 is better suited to shallow water tasks such as delivering a payload, such as module 500, close to shore. Examples of other such tasks include close shore logistics support missions and ship to objective maneuvers (STOM). If adjusting the ballast of the ship 100 does not decrease the draft sufficiently to put the hull in the logistics mode, the crew can secure to the ship 100 a buoyant module 500 that provides additional buoyancy sufficient to reduce the draft as needed.

Referring to FIG. 5B, in catamaran mode, the ship 100 rides relatively high in the water such that the hull 510 acts as a catamaran hull. A typical draft in catamaran mode is 12 feet. Therefore, in the catamaran mode, the hull 510 allows the ship 100 to travel at relatively high speeds in a relatively energy efficient manner and in relatively shallow water, and to undertake tasks that require these abilities. Examples of such a task include search and rescue, surface craft interdiction, high speed pursuit of surface craft and submarines, and other missions requiring high speed.

Referring to FIG. 5C, in SWATH mode, the ship 100 rides lower in the water than in the catamaran mode such that the hull 510 acts as a SWATH hull. In the SWATH mode, the ship 100 is slower and less energy efficient than in the catamaran mode, but it has better sea keeping and is better for transporting payloads or personnel long distances, and thus, is better for undertaking tasks that require these abilities. A typical draft in SWATH mode is 20 feet.

Referring to FIG. 5D, in low freeboard mode, the ship 100 rides lower in the water than in the SWATH mode such that the ship 100 has a low profile for stealth missions. That is, the portion of the ship 100 that rides above the waterline in the low freeboard mode is minimized to make the ship 100 less detectable than it is in the other three modes. Therefore, in the low freeboard mode, the ship 100 is suited for undertaking tasks that require secrecy or that otherwise require the ship 100 to ride low in the water. Furthermore, any additional stealth features, such as the shapes of the above water decks, need only be implemented on the portion of the ship 100 that rides above the waterline in the low freeboard mode, and not on the other larger portions of the ship 100 that ride above the waterline in the other modes. A typical draft in the low freeboard mode is 32 feet.

Other embodiments of the multi-mode hull 510 are contemplated. For example, the hull 510 may allow the ship 100 to operate in more or fewer than four modes, where some or all of these modes are different than those described above.

Still referring to FIGS. 5A–5D, the ship 100 may operate in one or more of the above-described hull modes when performing a single mission. For example, suppose the ship is to perform an anti-submarine-warfare mission at a location that is remote from the location where the crew loads the anti-submarine mission module 105 into the bay 110. At first, because the ship 100 (the frame 115, the module 105, or both) is loaded with fuel and supplies for the mission, the draft of the ship may be such that the ship operates in the SWATH mode (FIG. 5C). If the mission is secret, then the crew may add additional ballast (typically water) to cause the ship 100 to operate in the low-freeboard (stealth) mode (FIG. 5D). When the ship 100 reaches the mission location, then the fuel and supplies may be depleted sufficiently such that with the removal of a proper amount of ballast, the ship can operate in the catamaran mode (FIG. 5B) to, e.g., chase a submarine.

The preceding discussion is presented to enable a person skilled in the art to make and use the invention. The general principles described herein may be applied to embodiments and applications other than those detailed above without departing from the spirit and scope of the present invention. The present invention is not intended to be limited to the embodiments shown, but is to be accorded the widest scope consistent with the principles and features disclosed or suggested herein.

We claim:

1. A method, comprising:
    floating a mission module near a vessel having a multi-mode hull operable to allow the vessel to maneuver in at least three operational modes, the mission-module operable to enable the vessel to perform a function for a specific mission;
    retrieving the mission module with the vessel; and
    installing the mission module in the vessel, the installed module operable to enable distribution of resources from the module to the vessel.

2. The method of claim 1 wherein installing the mission module comprises moving the module into the vessel via a ramp.

3. The method of claim 1 wherein installing the mission module comprises installing the module in a bay of the vessel.

4. The method of claim 1 wherein the vessel comprises a ship.

5. The method of claim 1, further comprising maneuvering the vessel to the mission module before retrieving the module.

6. The method of claim 1, further comprising maneuvering the mission module to the vessel before retrieving the module.

7. The method of claim 1 further comprising maneuvering the vessel in a SWATH mode.

8. The method of claim 1 further comprising the vessel performing functions for a logistics support mission.

9. A method, comprising:
    floating a mission module near a vessel having a multi-mode hull operable to allow the vessel to maneuver in at least two operational modes, the mission-module operable to enable the vessel to perform a function for a specific mission;
    retrieving the mission module with the vessel; and
    installing the mission module in the vessel, the installed module operable to enable distribution of resources from the module to the vessel and comprising:
        lowering a ramp from the vessel;
        moving the module into the vessel via the ramp; and
        raising the ramp into a ramp storage area disposed beneath the module.

10. A method, comprising:
    floating a mission module near a vessel having a multi-mode hull operable to allow the vessel to maneuver in at least two operational modes, the mission module operable to enable the vessel to perform a function for a specific mission;
    maneuvering the vessel toward the mission module such that a bay of the vessel captures the module; and
    coupling a system interface of the mission module to a system interface of the vessel, thereby enabling distribution of resources from the module to the vessel.

11. The method of claim 10 wherein the bay is disposed in the bow of the vessel and the maneuvering comprises moving the vessel forward.

12. The method of claim 10 wherein the vessel is a multi-hull, water-born ship.

13. The method of claim 10 wherein the coupling comprises lifting the mission module into the bay of the vessel.

14. The method of claim 13 wherein the lifting comprises lifting the mission module with a crane system.

15. The method of claim 10 wherein the coupling comprises lowering the vessel to the mission module.

16. The method of claim 15 wherein the lowering comprises reducing the freeboard of the vessel with a ballasting system.

17. The method of claim 10 wherein the coupling comprises attaching the vessel to the mission module via a ship-to-module interface.

18. A method, comprising:
    disengaging a mission module from a vessel having a multi-mode hull operable to allow the vessel to maneuver in at least three operational modes, the mission module located in a bay of the vessel and operable to enable the vessel to perform a function for a specific mission and to enable distribution of resources from the module to the vessel;
    removing the module from the bay; and
    floating the mission module away from the vessel.

19. The method of claim 18, wherein floating the mission module away from the vessel includes maneuvering the vessel away from the module.

20. The method of claim 18, wherein floating the mission module away from the vessel includes maneuvering the module away from the vessel.

21. The method of claim 19 wherein the removing comprises sliding the mission module down a ramp.

22. The method of claim 18 wherein the disengaging comprises raising the vessel away from the mission module by increasing the freeboard of the vessel with a ballasting system.

23. A method, comprising:
removing a first mission module from a vessel having a multi-mode hull operable to allow the vessel to maneuver in at least three operational modes;
floating a second mission module near the vessel, the second mission module operable to enable the vessel to perform a function for a specific mission;
installing the second mission module in the vessel, the second mission module operable to enable distribution of resources from the module to the vessel.

24. The method of claim 23 wherein installing the second mission module comprises retrieving the second mission module from water while the vessel is floating in the water.

25. A vessel comprising a frame operable to retrieve a mission module floating near the frame, the module operable to enable the vessel to perform a function for a specific mission and to enable distribution of resources from the module to the vessel, the module further operable to be installed in the vessel, the vessel having a multi-mode hull operable to allow the vessel to maneuver in at least three operational modes.

26. A method, comprising:
floating a mission module near a vessel, the mission module operable to enable the vessel to perform a function for a specific mission;
maneuvering the vessel toward the mission module such that a bay of the vessel captures the module, the vessel operable to transport passengers from a first terrestrial location to a second terrestrial location;
coupling a system interface of the mission module to a system interface of the vessel, thereby enabling distribution of resources from the module to the vessel; and
wherein the bay is disposed in the bow of the vessel, and the maneuvering comprises moving the vessel forward.

27. A method, comprising:
floating a mission module near a vessel, the mission module operable to enable the vessel to perform a function for a specific mission;
maneuvering the vessel toward the mission module such that a bay of the vessel captures the module, the vessel operable to transport passengers from a first terrestrial location to a second terrestrial location;
coupling a system interface of the mission module to a system interface of the vessel, thereby enabling distribution of resources from the module to the vessel; and
wherein the coupling comprises lifting the mission module into the bay of the vessel with a crane system.

28. A method, comprising:
floating a mission module near a vessel having a multi-mode hull operable to allow the vessel to maneuver in at least two operational modes, one of which is a logistics mode, the mission-module operable to enable the vessel to perform a function for a specific mission;
retrieving the mission module with the vessel; and
installing the mission module in the vessel, the installed module operable to enable distribution of resources from the module to the vessel.

29. A method, comprising:
floating a mission module near a vessel having a multi-mode hull operable to allow the vessel to maneuver in at least two operational modes, one of which is a catamaran mode, the mission-module operable to enable the vessel to perform a function for a specific mission;
retrieving the mission module with the vessel; and
installing the mission module in the vessel, the installed module operable to enable distribution of resources from the module to the vessel.

30. A method, comprising:
floating a mission module near a vessel having a multi-mode hull operable to allow the vessel to maneuver in at least two operational modes, one of which is a low freeboard mode, the mission-module operable to enable the vessel to perform a function for a specific mission;
retrieving the mission module with the vessel; and
installing the mission module in the vessel, the installed module operable to enable distribution of resources from the module to the vessel.

31. A method, comprising:
floating a mission module near a vessel having a multi-mode hull operable to allow the vessel to maneuver in at least two operational modes, the mission-module operable to enable the vessel to perform an anti-mine mission;
retrieving the mission module with the vessel; and
installing the mission module in the vessel, the installed module operable to enable distribution of resources from the module to the vessel.

32. A method, comprising:
floating a mission module near a vessel having a multi-mode hull operable to allow the vessel to maneuver in at least two operational modes, the mission-module operable to enable the vessel to perform a littoral anti-submarine mission;
retrieving the mission module with the vessel; and
installing the mission module in the vessel, the installed module operable to enable distribution of resources from the module to the vessel.

33. A method, comprising:
floating a mission module near a vessel having a multi-mode hull operable to allow the vessel to maneuver in at least two operational modes, the mission-module operable to enable the vessel to perform an intelligence/surveillance/reconnaissance mission;
retrieving the mission module with the vessel; and
installing the mission module in the vessel, the installed module operable to enable distribution of resources from the module to the vessel.

* * * * *